United States Patent [19]

Yasuoka

[11] 4,260,577

[45] Apr. 7, 1981

[54] PROCESS FOR PRODUCING RUBBER HYDROCHLORIDE SHEET

[75] Inventor: Yoshio Yasuoka, Tokai, Japan

[73] Assignee: Takayoshi Narisue, Tokyo, Japan

[21] Appl. No.: 91,122

[22] Filed: Nov. 5, 1979

[30] Foreign Application Priority Data

Jul. 17, 1979 [JP] Japan .................................. 54-89977

[51] Int. Cl.³ ....................... B29D 7/20; B29C 17/00; C08C 19/16
[52] U.S. Cl. .................................... 264/280; 260/771; 264/175; 264/233; 264/343; 264/344
[58] Field of Search .............. 264/83, 175, 201, 210.2, 264/210.3, 216, 233, 280, 343, 344; 260/771

[56] References Cited

U.S. PATENT DOCUMENTS

| | | | |
|---|---|---|---|
| 1,841,295 | 1/1932 | Oenslager | 260/771 |
| 2,237,125 | 4/1941 | Walton | 264/216 |
| 2,393,871 | 1/1946 | Reeves, Jr. et al. | 264/343 |

FOREIGN PATENT DOCUMENTS 753814  8/1956  United Kingdom ..................... 264/201

*Primary Examiner*—James B. Lowe
*Attorney, Agent, or Firm*—Blanchard, Flynn, Thiel, Boutell & Tanis

[57] ABSTRACT

An improved process for the production of rubber hydrochloride sheet is described in which a rubber sheet is advanced through a reaction zone essentially in one direction while totally immersed in a solution of hydrogen chloride in an organic solvent capable of swelling the rubber, flotation of the rubber sheet in the reaction solution being prevented, and the slack in the sheet caused by the initial swelling thereof being taken up to keep the sheet in substantially fully extended form to prevent it from contacting itself while in tacky condition, washing the sheet with an organic solvent or mixture thereof capable of removing the entrained, unreacted hydrogen chloride and other contaminants, drying the sheet in air at about 60° C. to 80° C., and calendering the still warm sheet to a finished rubber hydrochloride sheet of uniform thickness; the preferred solvent for both the hydrochlorination and washing operations being ethyl acetate.

10 Claims, 2 Drawing Figures

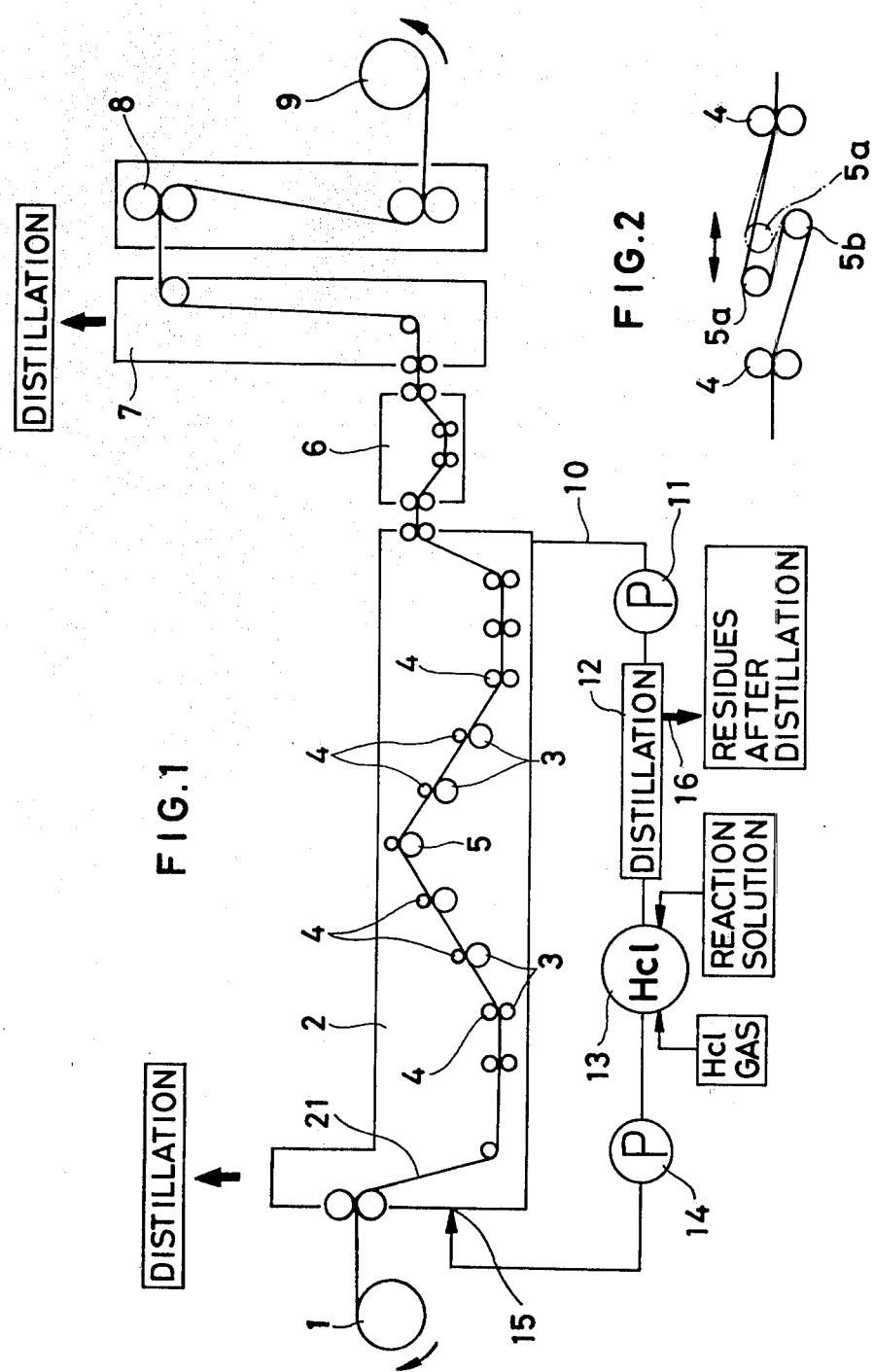

PROCESS FOR PRODUCING RUBBER HYDROCHLORIDE SHEET

BACKGROUND OF THE INVENTION

Rubber hydrochloride in sheet form is an article of commerce having a wide variety of known uses. This material is produced by the treatment of a continuous elongated sheet or strip of latex rubber with a solution of hydrogen chloride. This normally results in initial softening, swelling and tackiness of the rubber sheet with consequent elongation and difficulty of handling the sheet without damage, either due to its low tensile strength at that stage or due to adhesion of the sheet to itself while in the tacky state. It has previously been proposed to avoid such self-adhesion of the sheet by leading it back and forth in a zigzag course over rollers, for example, in an enclosed reaction zone with the initial movement of the sheet being downwards to minimize tension in advancing the sheet. It has been found, however, that this means of handling the advancing sheet is suitable for only about the first 5 minutes of the initial reaction period while the sheet is swollen, tacky and limp. As the initial hydrochlorination reaction proceeds during the next 10 minutes, the sheet begins to stiffen and it becomes more and more difficult to pass the sheet around the zigzag path as it becomes more and more inflexible. Moreover, the stiffness of the sheet continues to increase during the remainder of the hydrochlorination reaction up to the point of complete hydrochlorination which is reached after about 30 to 60 minutes of treatment. This increased stiffness also makes it difficult to withdraw the rubber hydrochloride from the apparatus in the form of an elongated tape or strip of finished rubber hydrochloride.

It has also been customary in the prior art processes to remove excess entrained, unreacted hydrogen chloride solution by vaporization in a heated zone. However, such evaporative removal has the disadvantages that the high heat required for the evaporation and residual hydrogen chloride degrade the rubber hydrochloride causing it to discolor. Furthermore, no practical means has yet been devised to treat the evaporated reaction solution, e.g. of hydrogen chloride in ethyl acetate.

It is a primary object of the present invention, therefore, to provide an improved process for the production of rubber hydrochloride sheet which avoids the handling problems attendant on prior art processes, and which produces a superior product free from contaminates and discoloration.

It is a more particular object of the invention to provide a process which insures thorough immersion and treatment of the rubber sheet while avoiding self-adhesion of the sheet while it is in tacky condition.

It is another object of the invention to provide improved handling of the rubber sheet during hydrochlorination thereof to avoid slack in the sheet due to the initial swelling thereof.

It is still another object of the invention to avoid subjecting the rubber sheet to a zigzag passage after it becomes too stiff for such handling.

It is yet another object of the invention to avoid discoloration of the rubber hydrochloride sheet by residual reaction solution and/or overheating during the removal of reaction solution or other contaminants.

It is another object of the invention to avoid the introduction of water or contaminants from the neutralization of hydrogen chloride.

It is a further object of the invention to provide rubber hydrochloride sheet of uniform thickness by calendering the sheet at an elevated temperature, preferably before it cools from the drying operation.

SUMMARY OF THE INVENTION

The foregoing and other objects of the invention which will become apparent below are attained by producing rubber hydrochloride sheet by continuously advancing an elongated sheet, tape or strip of rubber through a reaction zone containing a solution of hydrogen chloride in an anhydrous organic solvent capable of swelling the rubber. The preferred reaction solution is a saturated solution of hydrogen chloride in anhydrous ethyl acetate. The advancing sheet is maintained fully immersed in the reaction solution by preventing the sheet from floating to the surface of the solution of hydrogen chloride as it has a tendency to do because of the lower specific gravity. As the rubber sheet initially contacts the reaction solution the solvent swells the rubber and it becomes tacky and is elongated by the loss in tensile strength and softening of the sheet. Such elongation of the sheet on initial treatment may amount to as much as 20% or more. This would result in substantial slack in the sheet and the possibility of the sheet clumping up or coming into contact with itself as it advances through the reaction zone. This would be most disadvantageous, since the sheet becomes quite tacky at that stage of the reaction and would adhere to itself causing distortion, tearing, thinning or other damage on subsequent separation. In the present invention such damage is entirely avoided by compensating for the inevitable slack in the sheet by the extension of the sheet to take up the slack by any suitable means.

After taking up or removing the slack in the sheet, its advance through the reaction zone is continued without interruption as the reaction proceeds and the treated sheet becomes increasingly stiffer, stronger and less tacky. When the hydrochlorination reaction has been completed as evidenced by the maximum normal stiffness of the sheet and the loss of its initial tackiness, the sheet is fed into a washing zone through which it is advanced as before, but in contact with an anhydrous organic solvent for the excess, unreacted, entrained hydrogen chloride and any other contaminants present on the sheet. The solvent employed in the washing operation may be any low-boiling organic solvent for hydrogen chloride compatible with the solvent of the reaction solution. The washing solvent is preferably the same as the solvent of the hydrogen chloride reaction solution. The preferred solvent is, therefore, anhydrous ethyl acetate.

The washed sheet is then advanced further through a drying zone at an elevated temperature. A temperature of about 60° C. is suitable to facilitate drying, although lower temperatures may be employed with longer drying cycles. Temperatures as high as about 80° or somewhat higher may be employed in the drying operation, however, the upper limit of temperature is dictated by avoidance of deterioration or degradation of the rubber hydrochloride with consequent discoloration. The drying operation may be conducted in a vacuum if desired, but it is preferred to employ rapidly circulating air to speed the operation.

The dried sheet exiting from the drying operation is preferably fed directly to a calendering operation in which the sheet, still containing heat from the dryer, is smoothed and shaped to form a rubber hydrochloride sheet of uniform thickness which may be wound up in rolls for storage or immediately cut into commercial size sheets.

The invention will now be described in greater detail in conjunction with preferred embodiments thereof shown in the accompanying drawings.

BRIEF DESCRIPTION OF THE DRAWINGS

FIG. 1 is a schematic side elevational view of a preferred process of the invention for producing rubber hydrochloride sheets; and FIG. 2 is a schematic side elevational view of an alternative means for taking up slack in the advancing rubber sheet.

DETAILED DESCRIPTION OF THE INVENTION

In FIG. 1 an elongated sheet, tape or strip of rubber 21 is fed from a supply roll 1 by any suitable means such as the schematically illustrated feed rollers and introduced to the reaction zone which may be a suitably elongated tank 2 containing a solution of hydrogen chloride in a solvent capable of swelling the rubber. Any suitable anhydrous organic solvent for hydrogen chloride may be used if it swells the rubber sufficiently, but it is preferred to use a relatively low-boiling organic solvent capable of absorbing a substantial volume of hydrogen chloride. The preferred solvent is anhydrous ethyl acetate and it is especially preferred that the solvent be saturated with hydrogen chloride. A saturated solution of hydrogen chloride in anhydrous ethyl acetate normally has a specific gravity in the range from about 1.05 to about 1.08. Sheet rubber or latex may typically have a specific gravity of about 0.9. It is apparent, therefore, that such sheet rubber has a tendency to float to the surface of the reaction solution if permitted to do so. Such flotation could lead to incomplete treatment unless the reaction zone or vessel were liquid full to prevent portions of the sheet from protruding above the surface of the treating solution.

Therefore, it is an important element of the present invention to keep the rubber sheet fully immersed in the treatment solution during its passage through the reaction zone. As noted, this may be accomplished by employing a liquid-full reaction zone or vessel with no head space above the treating solution. This may be achieved by the use of a floating cover on the reaction vessel. It is more practical and convenient, however, to achieve full submersion by the use of flotation prevention means such as the rollers 4 or any equivalent means for holding the rubber sheet beneath the surface of the reaction solution.

The rubber sheet is advanced through the reaction zone at a predetermined rate, e.g. 0.5 meters per minute, depending on the length thereof, to provide sufficient residence time for complete or substantially complete hydrochlorination of the rubber. A suitable advancement rate is such as to provide a total residence time of the rubber sheet in the anhydrous organic solution of hydrogen chloride of about 50 to 60 minutes. Typically and preferably, this residence time will include a primary reaction period of about 15 minutes, and a secondary reaction period of about 40 minutes for completion of the reaction. The primary reaction period of about 15 minutes includes an initial period of about 5 to 10 minutes during which the rubber sheet softens, swells, becomes tacky and is elongated under the influence of the solvent. During the remainder of the primary reaction period the initial hydrochlorination of the rubber causes it to begin to stiffen, gain in tensile strength and decreases in tackiness.

Referring to FIG. 1 again, which is schematic only and not necessarily in scale, the primary reaction period of about 15 minutes begins with the introduction of the rubber tape 21 into the reaction zone wherein it softens, swells, becomes tacky and elongated in the first 5 to 10 minutes of travel over the conveyor rollers 3 and beneath the flotation prevention rollers 4. During this period the rubber sheet softens and swells to such a degree that its length is materially increased, on the order of about 20%, more or less. This increase in length of the rubber sheet is taken up and compensated for by the slack absorption rollers 5 or any other suitable means for maintaining the tape or strip 21 in substantially extended form as shown so that it cannot look or fold upon itself with adhesion due to its tacky condition at this stage of the process.

FIG. 2 illustrates an alternative slack absorption means in which the strip is fed around a stationary roller 5b and then around a roller 5a which is transversely displaceable relative to the fixed roller 5b in order to take up the slack in the sheet 21 as necessary to compensate for its elongation on softening. Such a single reversal of direction of travel of the strip 21 is the only exception to its essentially one-directional travel through the reaction zone.

The rubber sheet 21 is advanced through the reaction zone 2 at a steady rate essentially in one direction over the full reaction period of 50 to 60 minutes. However, the primary reaction period of about 15 minutes, during which the sheet swells and is elongated prior to the slack absorption means 5, is shown in expanded form in the drawing for purposes of illustration. Similarly, the longer 40 minute secondary reaction period in tank 2 has been shortened in the schematic representation in FIG. 1 only for purposes of illustration.

As noted above, after the initial reaction period of about 5 to 10 minutes, the rubber sheet or strip 21 becomes increasingly stiff and decreasingly tacky as residence time in the reaction solution lengthens and the sheet advances through the reaction zone. After the primary reaction period of about 15 minutes, and beyond the slack absorbing means, the sheet continues to advance over conveyor rollers or similar means 3 and beneath the flotation prevention rollers 4 until the hydrochlorination reaction is completed at the end of the secondary reaction period of about 40 minutes for a total evidenced by maximum normal stiffness and minimal normal tackiness of the sheet.

The sheet or strip 21 is then advanced at the same rate by a conveyor, rollers or other suitable means into a washing zone 6 where it is contacted with an anhydrous organic solvent for hydrogen chloride by any suitable means, preferably by immersion as in the the reaction zone. Here again, any suitable anhydrous organic solvent for hydrogen chloride may be used it being preferred to use a low-boiling organic solvent, and, especially, the same solvent as that of the hydrogen chloride reaction solution. The preferred solvent is anhydrous ethyl acetate. While immersion is preferred, the solvent may be showered or sprayed onto the rubber sheet.

In the present invention in which an anhydrous hydrogen chloride reaction solution is employed, such as HCl-saturated ethyl acetate, for example, substantially complete washing is achieved by sufficient contact with anhydrous ethyl acetate, since it is an excellent solvent for any unreacted entrained hydrogen chloride or the solution thereof, in ethyl acetate. In this way the removal of water or water soluble neutralization products of hydrogen chloride with bases are avoided with the attendant problems of removing such aqueous materials which characterize the prior art. Inasmuch as all contaminants on the rubber in the present process are anhydrous and soluble in common low boiling organic solvents, any such solvent or a mixture thereof may be used in the washing step either together with or instead of ethyl acetate.

The washed strip 21 is then led into a drying zone such as the tower shown schematically at 7 in FIG. 1. The drying operation may be carried out in a vacuum, but is preferably performed in circulating air at an elevated temperature of about 60° C. to about 80° C. When the sheet is substantially dry and at a temperature above ambient temperature, preferably about 60° C. to about 80° C., it is passed through one or more pairs of rollers 8 or the like which calender or smooth and shape the rubber hydrochloride strip to a uniform thickness. The finished product is then wound up on roller 9 and stored or shipped or cut to commercial size sheets as desired. This calendering operation serves to remove any deformations of the rubber sheet due to handling thereof while it was soft and swollen, although such deformations have already been minimized by the improved handling techniques of the new process.

Referring to FIG. 1, pump 11 serves to withdraw, either continuously or intermittently, partially spent reaction solution from the reaction vessel and transfer it to a distillation tower 12 by means of which the organic solvent of the reaction solution is recovered for re-use. Residues from this distillation are discharged from outlet 16. Fresh reaction solution is made up in tank 13 by introducing organic solvent thereto either from a fresh supply or by recycling from the distillation operation 12 or both. Hydrogen chloride gas is charged to the tank 13 as shown to make up the fresh reaction solution which is then transferred to the forward part of the reaction vessel 2 by means of pump 14 and inlet 15.

From the foregoing, it will be apparent that the new process achieves the objects of the invention and avoids the problems of the prior art. More specifically, the new process avoids the handling difficulties of the prior art caused by the inevitable swelling and consequent elongation of the strip of rubber on the order of about 20%. Therefore, there is no slacking of the sheet in passage through the reaction zone and no possibility of adhesion of the sheet to itself with consequent damage and difficulty in handling.

Further, the process avoids the difficulties of the zigzag process of the prior art in conveying the stiffening sheet around sharp bends, since the movement of the sheet through the reaction zone is essentially in one direction without reversal of direction, except for the minor, single change of direction in the alternative slack absorbing means of FIG. 2. Therefore, there is no interruption of the smooth passage of the sheet through the reaction zone as has been common with the zigzag apparatus of the prior art in which the sheet tends to clog, clump or jam up in the apparatus.

Stiff further, the flotation prevention means described contribute to the significant improvement in the final product in assuring uniform treatment of the rubber sheet and avoiding any possibility of untreated areas in the sheet. Therefore, the rubber hydrochloride product is of uniform quality.

The washing step employing an anhydrous organic solvent, whether a single solvent or mixed solvents, and preferably the same solvent as the reaction solution, avoids the problems of the prior art heat evaporization method of removing the reaction solution. In the prior method removal of reaction solution was incomplete, leaving a dried residue of hydrogen chloride on the product. This residue, especially when subjected to high heat or aging, degraded and discolored the rubber hydrochloride. The new washing operation, on the other hand, provides complete removal of the hydrogen chloride without overheating or degradation of the product and the well-washed product does not deteriorate on aging due to residual hydrogen chloride. The use of the same solvent in washing operation and reaction solution also contributes to economy and convenience.

Finally, the shaping or calendering operation on the rubber hydrochloride sheet at an elevated temperature, assures a more uniform sheet, free from thin or weak spots, distortions, wrinkles or sagging areas and having a uniform thickness. Thus improved uniformity of the sheet permits the product to be stretched to form a thinner film of uniform quality without distortion or thin, weak or sagging areas.

What is claimed is:

1. In a process for the production of rubber hydrochloride in sheet form in which a sheet of rubber is treated with a solution of hydrogen chloride with consequent intitial swelling elongation and tackiness followed by an increase in tensile strength and stiffness of the sheet, washing to remove excess entrained hydrogen chloride, and drying of the rubber hydrochloride sheet, the improvement which comprises:

continuously advancing the rubber sheet through a reaction zone containing a solution of hydrogen chloride in an organic solvent capable of swelling the rubber, maintaining said sheet fully immersed in said solution by preventing flotation of said sheet therein, compensating for the initial elongation of said sheet as it advances through the reaction zone to prevent any part of said sheet from contacting any other part thereof, thus preventing damage to said sheet while in a tacky state, washing the hydrochlorinated sheet with an organic solvent to remove substantially all of the entrained hydrogen chloride and any other contaminants, drying the washed sheet at an elevated temperature, and calendering said sheet at an elevated temperature to obtain rubber hydrochloride sheet of uniform thickness.

2. The process of claim 1 wherein the organic solvent employed in the washing operation is the same as the solvent of the solution of hydrogen chloride.

3. The process of claim 2 wherein the organic solvent is ethyl acetate.

4. The process of claim 1 wherein the drying operation is carried out at a temperature from about 60° C. to about 80° C.

5. The process of claim 1 wherein the calendering operation is carried out with the rubber hydrochloride sheet at a temperature above ambient temperature up to about 80° C.

6. The process of claim 1 wherein the drying operation is carried out at a temperature from about 60° C. to about 80° C. and the calendering operation is carried out on the dried rubber hydrochloride sheet while it still retains heat imparted to the sheet during the drying operation.

7. The process of claim 6 wherein the calendering operation is carried out with the sheet at a temperature above ambient temperature up to about 80° C.

8. A process according to claim 1 comprising continuously advancing a rubber sheet through a reaction zone containing a saturated solution of hydrogen chloride in ethyl acetate, preventing flotation of said sheet in said solution so that it is fully immersed therein as it travels through the reaction zone, taking up the slack in said sheet caused by the initial swelling thereof on hydrochlorination so as to maintain said sheet in substantially fully elongated condition to prevent contact of said sheet with itself while in tacky condition, continuing to advance said sheet through said solution in the reaction zone until the hydrochlorination reaction is substantially complete as evidenced by stiffening of the sheet and loss of tackiness thereof, advancing said sheet through a washing zone in contact with ethyl acetate whereby substantially all entrained unreacted hydrogen chloride and other contaminants are removed, passing said washed sheet through a drying zone in contact with circulating air at a temperature in the range from about 60° C. to about 80° C., and calendering the resulting dried sheet still containing heat from the drying operation to produce rubber hydrochloride sheet of uniform thickness.

9. The process of claim 8 wherein the residence time of said sheet in the reaction zone is about 30 to about 50 minutes.

10. The process of claim 8 wherein the initial reaction causing swelling continues for about 5 to about 15 minutes and results in an elongation of about 20% in the sheet, the resulting slack being taken up to prevent the sheet from contacting itself while in tacky condition.

* * * * *